May 6, 1952 T. L. DIMOND 2,595,232
TELEPHONE SWITCHING SYSTEM EMPLOYING A TRANSISTOR
Filed April 29, 1949
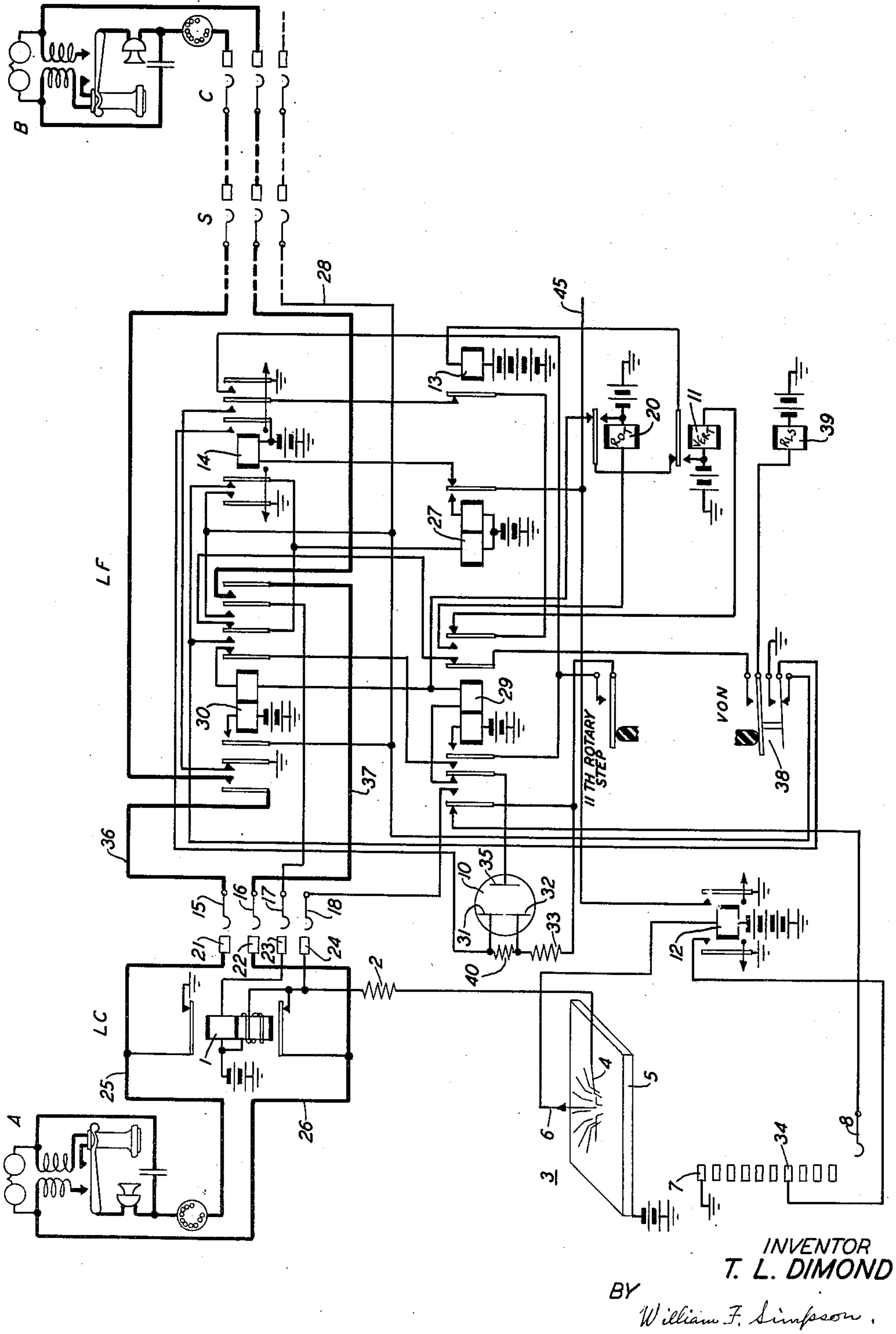
INVENTOR
T. L. DIMOND
BY
William F. Simpson.
ATTORNEY Patented May 6, 1952

2,595,232

UNITED STATES PATENT OFFICE 2,595,232

TELEPHONE SWITCHING SYSTEM EMPLOYING A TRANSISTOR

Thomas L. Dimond, Rutherford, N. J., assignor to Bell Telephone Laboratories, Incorporated, New York, N. Y., a corporation of New York Application April 29, 1949, Serial No. 90,516

4 Claims. (Cl. 179—18)

This invention relates to telephone systems and particularly to those systems in which automatic switches are used for establishing connections.

Objects of the invention are to eliminate some of the individual equipment usually provided for subscribers' lines; to enable the automatic switches to select a subscriber's line by means of a simple and positive test; to provide a more reliable test for controlling the stepping action of the switch while hunting for a subscriber's line; and to otherwise improve systems of this character.

It has been proposed heretofore to eliminate the individual line relays and to replace them by a relay mechanism common to a group of lines. To accomplish this, it has been necessary to provide some sort of switching mechanism for associating the common relays with any one of the lines when it calls.

It has also been proposed to use a vacuum tube in common to a group of lines and to connect the control element through individual resistances to the respective subscribers' lines, thus doing away with the individual line relays. An arrangement of this kind is subject to false operation due to the combined effect of several line leaks, and it does not lend itself readily to a positive and reliable test to enable the line finder to distinguish and seize the particular line in the group that is calling.

It has also been proposed to use a gas discharge tube in common circuit with an electrode individual to each of the lines. Such an arrangement has at least two different difficulties. In the first place tubes of this type are very sensitive to stray fields and transients which cause false operation of the tubes. In the second place the tubes have widely varying control characteristics so that they will not meet the various circuit limitations encountered in usual telephone lines. Furthermore in the case of gas tubes, special provision must be made to extinguish discharges through the tube to return it to its normal or idle position.

According to the present invention these difficulties are overcome by means of a system in which a transistor device having a multiplicity of emitter electrodes is provided in common to a group of subscribers' lines. The emitter electrodes are individual respectively to the subscribers' lines and serve to cause a collector current to flow in the device when any one of said lines initiates a call. The collector current of the device causes the starting of a line finder to hunt for the calling subscriber's line.

A transistor comprises a base element comprising a semiconducting or rectifying material, a collector electrode of small dimensions held in contact with the base element, and usually biased in the non-conducting or high resistance region of the characteristic of the semiconductor material, and an emitter electrode also of small dimensions held in contact with the base and usually in close proximity to the collector electrode. Silicon and germanium with certain impurities are two materials suitable for base elements of a transistor. Other rectifying materials and rectifying crystals and combinations thereof may be employed for the base or other elements of the transistor when desired. Reference is made to United States Patent 2,524,035, granted to Bardeen and Brattain, October 3, 1950, for a more detailed description of a transistor.

A feature of this invention relates to the use of transistor having a plurality of emitter elements in which the emitter most positive with respect to the base, for base materials requiring positive emitters, takes over almost exclusive control of the collector current. Thus with an emitter individual to each line only the line with the lowest leakage resistance determines the normal or steady state collector current through the emitter. In other words the leakage resistances of all the lines to which one transistor is common do not produce additive effects upon the emitter. Furthermore the current amplification of the emitter permits improved operating limits and margins since the line relay or start relay current need not be transmitted over the subscriber's line. Sufficient current for operating such a relay may be readily obtained from the transistor while the line is only required to transmit sufficient current to control the voltage of the emitter individual thereto. Thus the operating limits of the line circuit is rendered substantially independent of relay adjustments and limitations and depend merely upon the transistor characteristics.

The foregoing and other features of the invention will be described in detail in the following specification, which should be taken in conjunction with the accompanying drawing.

The drawing represents schematically a telephone system in which the features of the invention are embodied and which employs automatic switches of the well-known two-motion step-by-step type. It is to be understood, however, that the embodiment of the invention in this particular system is given by way of illustration only, and that the invention may be applied to automatic telephone systems employing other types of switches.

Referring to the drawing, there are shown a calling subscriber's station A and the associated line circuit LC, a line finder switch LF, a selector switch S, a connector switch C, and a called subscriber's station B.

The subscribers' stations A and B are provided with the usual subscriber's set which is equipped with a dial for controlling the establishment of the desired connections. The selector switch S and the connector switch C are of the well-known step-by-step or Strowger type, and reference may be had to pages 53 to 67 inclusive of the 2nd edition of "Automatic Telephony" by Smith and Campbell for a detailed description of the operation of the circuits associated with these switches. Only those portions of the circuits of the selector and connector switches are shown that are required for a clear and complete description of this invention, the omitted portions of these circuits being indicated by broken lines.

The line circuit LC and the line finder switch LF are shown in detail since the features of the invention apply specifically to these circuits. A transistor 3, having a multiplicity of control frequently called emitter electrodes, such as electrode 4, is associated with each group of line circuits.

The transistors employed in the exemplary embodiment set forth herein are the type wherein the collector is provided with a negative bias which does not cause appreciable current to flow to this element. The emitters are also biased negatively. When a positive voltage is applied to any one of the emitters current flows both in the circuit of the emitter electrode and also in the circuit of the collector electrode.

Each individual line circuit of a group, such as line circuit LC, connects to one of the emitter electrodes 4 of the transistor 3, and, when a call is originated by a subscriber, a potential change on a control electrode or emitter associated with that line circuit causes current to flow in the circuit of the base 5 and the collector 6 of the transistor 3, and cause the line finder switch LF to hunt for the calling line. Current flow in the line also places an identifying potential on the test terminal of the calling line to enable the line finder to select the terminals associated with this line.

Each line circuit connects to a set of four terminals appearing in the terminal banks of the line finder switch, as indicated by the individual line circuit LC which connects to terminals 21, 22, 23 and 24. The line finder switch LF is of the well-known step-by-step type provided with a bank of one hundred sets of terminals, such as the set composed of terminals 21, 22, 23 and 24. These terminal sets are arranged in ten vertical levels, each level consisting of ten horizontal terminal sets, and are selectable by brushes 15, 16, 17 and 18, which, by means of a common shaft (not shown), are advanced vertically to the proper level and then horizontally to the terminals of the calling line under control of the vertical operating magnet 11 and the rotary operating magnet 20, respectively. Relay 13, which is connected in the anode circuit of a cold cathode type gaseous discharge tube 10, controls the operating circuits for magnets 11 and 20. The line finder is provided with a commutator 7 having ten conducting segments, one segment for each corresponding level of the line finder bank terminals. Associated with commutator 7 is a brush 8 which is mounted on the common brush shaft (not shown) and which advances simultaneously with brushes 15 to 18 inclusive, during vertical stepping. Tube 10, under control of commutator 7 and brush 8 during vertical stepping, and under control of test terminal 24 of the calling line and test brush 18 of the line finder during rotary stepping, breaks down when the proper level and the calling line terminals are encountered and causes relay 13 to operate and open the operating circuits for magnets 11 and 20 respectively, thereby preventing the line finder brushes from taking a false additional vertical or rotary step. The operations of these circuits will now be fully set forth in detail in the following description of a call from station A to station B.

The base 5 of the transistor 3 is connected to a source of negative potential, and the collector 6 is connected to another and higher voltage source of negative potential through the winding of relay 12. The potential difference between the base 5 and collector 6 of the transistor 3 is within the operating range of the transistor and is of such a magnitude that, in the absence of a voltage, more positive than the base voltage, applied to one of the emitters, substantially no current flows between the base 5 and collector 6 of the transistor 3. Each of the emitters 4 of the transistor is biased to a voltage negative with respect to the base 5 through resistance 2 and the lower winding of cut-off relay 1 of the line circuit LC. The potential on relay 1 is of a higher negative value than that connected to the base 5.

When the receiver is removed from the switchhook at station A to originate a call, a circuit is completed from ground over the upper back contact of relay 1, tip conductor 25, loop of station A, ring conductor 26, to negative potential over the lower back contact and through the lower winding of relay 1. The resulting current flow causes a reduction in the negative potential on the control electrode or emitter 4 of transistor 3 and on test terminal 24 in the line finder terminal banks. Due to this reduction in potential, control electrode or emitter 4 becomes sufficiently positive with respect to base 5 that current flows in the collector circuit of the transistor. Relay 12 operates in a circuit from negative battery potential through its winding, over the circuit of collector 6 and base 5 of the transistor 3 to a negative battery of lower negative voltage.

Assume that terminals 21, 22, 23 and 24, associated with the line circuit of calling station A, are the fifth set of terminals in the fourth level of the line finder switch terminal banks. Transistor 3 is common to all of the ten lines appearing in the fourth level of the terminal banks, each of these lines connecting to one of the ten control electrodes or emitters of the transistor 3. Relay 12 is therefore common to all ten lines in the fourth terminal level and functions as a group start relay for all lines in that level. Relay 12, operating in response to the initiation of the call at station A, connects ground over its left front contact to the fourth conducting segment of commutator 7 which corresponds to the fourth level of the line switch terminal banks, and connects ground over its right front contact and over the back contact of relay 27 to battery through the winding of relay 14, operating that relay.

Relay 14, in operating, connects negative potential over its right inner front contact to electrode 31 of gaseous discharge tube 10, and operates vertical operating magnet 11 in a circuit from ground over the left back contact of relay 30, right middle front contact of relay 14, back contact of relay 13, right outer back contact of relay 29, to battery through the winding of magnet 11. Vertical magnet 11, in operating, operates relay 13 in a circuit from positive potential through the winding of relay 13 to negative potential over the armature and front contact springs of magnet 11, and, in addition, causes the line finder brushes 8, 15, 16, 17 and 18 to make one vertical step. The lower control electrode 32 of tube 10 is connected, in a circuit through resistance 33 and over the left outer back contact of relay 29, to the commutator brush 8. On the first vertical step of the brushes, brush 8 contacts the first conducting segment of commutator 7 but, since this segment is open, tube 10 does not function at this time. Relay 13, in operating, opens the operating circuit for magnet 11 which releases, in turn releasing relay 13. The release of relay 13 again closes the operating circuit for magnet 11 which causes the line finder brushes to make the second vertical step. The operation of magnet 11 also operates relay 13 which opens the circuit for magnet 11. Magnet 11 releases, in turn releasing relay 13 which again operates magnet 11 and the line finder brushes make the third vertical step. Magnet 11, in operating, operates relay 13 which opens the circuit through magnet 11. Magnet 11 releases and releases relay 13 which closes the circuit for magnet 11. Magnet 11, in operating, operates relay 13 and advances the line finder brushes to the fourth level, brush 8 contacting the fourth conducting segment of the commutator 7.

A circuit is now closed from ground over the left front contact of relay 12, segment 34, brush 8, outer left back contact of relay 29, through resistance 33, to the lower or control cathode 32 of tube 10. Since negative potential is connected to the upper cathode 31 over the right inner front contact of relay 14, tube 10 breaks down due to the potential difference between cathodes 31 and 32. Upon the operation of magnet 11 for the fourth vertical step of the line finder brushes as has just been set forth, relay 13 operates and opens the circuit through magnet 11. Magnet 11 releases and completes the circuit from positive potential through the winding of relay 13, over the back contacts of magnets 11 and 20, through the right winding and over the left inner back contact of relay 29 to anode 35 of tube 10. Since tube 10 is broken down, as previously stated, relay 29 operates and relay 13 holds or, if already released immediately reoperates in the circuit just traced to the anode 35, to the previously traced negative potential on cathode 31. Relay 13, operated, holds the energizing circuit for vertical magnet 11 open, thereby preventing the line finder brushes from making a false additional vertical step.

The left inner armature and front contact springs of relay 29 are arranged to close before any of the back contacts open and relay 29, upon operating through its right winding, locks from battery through its left winding and over its left inner front contact, to ground over the right outer front contact of relay 14. Relay 29, in operating, opens the operating circuit for vertical magnet 11 and, over its right front contact, partially closes the operating circuit for rotary magnet 20. Relay 29, in operating, also transfers the circuit of anode 35 of tube 10 from positive potential over the previously traced circuit through the right winding of relay 29, to the same positive potential in a circuit traceable over the left middle front contact of relay 29, right inner back contact and right winding of relay 30, back contacts of magnets 20 and 11, and through the winding of relay 13. During the transfer time of the left middle armature of relay 29 from its back to its front contact, the anode circuit of tube 10 is momentarily opened, thereby causing the tube to deionize and become non-conducting and causing relay 13 to release. In addition, the operation of relay 29 transfers the circuit of control cathode 32 of tube 10 from commutator brush 8 to test brush 18.

Relay 13, in releasing, energizes rotary operating magnet 20 in a circuit from battery through the winding of that magnet, over the right front contact of relay 29, back contact of relay 13, right middle front contact of relay 14, to ground over the left back contact of relay 30. Magnet 20, in energizing, causes brushes 15 to 18 inclusive to make one rotary step and contact the first set of terminals in the fourth level of the line finder terminal banks. Since it has been assumed that terminals 21 to 24 inclusive are the fifth set of terminals of the fourth level, the test terminal of the first four terminal sets are at the same potential as cathode 31 of tube 10. As test brush 18 encounters these test terminals, tube 10 does not function since both cathodes are at equal potential. Magnet 20, as it operates for each rotary step of the line finder brushes, operates relay 13 in a circuit from negative potential over its front contact, over the back contact of magnet 11, to positive potential through the winding of relay 13. Relay 13, in operating, opens the operating circuit for magnet 20 which releases and connects the positive potential, through the winding of relay 13 and the right winding of relay 30 over a previously traced circuit, to the anode 35 of tube 10. Since tube 10 does not break down when test brush 18 contacts the test terminals of the idle lines, relay 13 immediately releases upon each release of magnet 20 as the line finder brushes rotate across the first four sets of terminals in the fourth level of the terminal banks. Each release of relay 13 again closes the operating circuit for magnet 20 which energizes and advances the brushes to the succeeding set of terminals. Upon the fifth operation of magnet 20, brushes 15, 16, 17 and 18 contact terminals 21, 22, 23 and 24 respectively of the line circuit associated with the calling station A. As hereinbefore set forth, the potential on test terminal 24 is lower than the potential on the test terminal of idle lines due to the voltage drop caused by the flow of current in the lower winding of relay 1. As test brush 18 contacts terminal 24 this reduced voltage is impressed on control cathode 32 of tube 10 in the circuit over the left outer front contact of relay 29 and through resistance 33. Since cathode 31 is at full negative potential, the potential difference between cathodes 31 and 32 causes tube 10 to break down and become conducting.

The operation of magnet 20 for the fifth step of the line finder brushes operates relay 13 which, in turn, opens the circuit through the winding of the magnet. Magnet 20, in releasing, closes the previously traced circuit from the positive potential through the winding of relay 13 and through the right winding of relay 30 to anode 35 of tube 10. Since tube 10 is in the conducting condition, relay 30 operates and relay 13 remains operated or, if already released, immediately reoperates, in the aforementioned circuit, over the anode-cathode circuit of tube 10, to negative potential on cathode 31. Relay 13, operated, holds the energizing circuit for magnet 20 open and thereby prevents the line finder brushes from taking a false additional rotary step.

The left inner armature and front contact springs of relay 30 are so arranged that they close before any of the back contacts open, and relay 30, in operating, immediately locks in a circuit from battery through its left winding and over its left inner front contact to ground over the left front contact of relay 14. Relay 30, in operating, opens the circuit to the anode 35 of tube 10 thereby deionizing the tube and releasing relay 13. Relay 30 also opens the operating ground for magnets 11 and 20 over its left back contact, and closes the tip and ring conductors 36 and 37 from the line finder bank terminals 21 and 22 over its left and right outer front contacts respectively, to the succeeding selector circuit S. Relay 27 operates in a circuit from battery through its left winding, over the right inner front contact of relay 30, to ground over the lower armature and front contact of the vertical off-normal springs 38 which previously operated upon the first vertical step of the line finder brushes. Relay 27 opens the circuit to the winding of relay 14 and may under certain conditions lock through its right winding to ground over the start wire 45. Cut-off relay 1 of line circuit LC also operates, upon the operation of relay 30, in a circuit from battery through its upper winding, over terminal 23 and brush 17, right middle front contact of relay 30, to ground over the left front contact of relay 14.

Relay 1, in operating, opens the circuit through its lower winding and, since the flow of current through that winding ceases, the potential on control electrode or emitter 4 of transistor 3 assumes the full negative value and becomes negative with respect to the potential on base 5. When the current in the collector base path of the transistor falls to substantially zero in response to the operation of relay 1 and the removal of the more positive potential from one of the emitters relay 12 releases and removes the ground from segment 34 of commutator 7 and also opens the circuit through the right winding of relay 27.

When the tip and ring conductors 36 and 37 respectively, are extended to the selector switch S by the operation of relay 30, the selector S functions and returns a ground over lead 28 for the purpose of holding relays 1 and 30 operated. As previously stated, the operation of relay 27 opens the circuit through the winding of relay 14. Relay 14, being slow to release, maintains the holding ground for the left winding of relay 30 and for the upper winding of relay 1 until selector S functions and returns ground for this purpose over conductor 28. Relay 14 releases after an interval, and opens the circuit through the left winding of relay 29. Relay 29 releases and partially closes the future operating circuit for release magnet 39.

Under control of dial impulses from the calling station A, the selector switch S and connector switch C function and complete the connection to the called station B.

At the conclusion of the conversation, when the subscribers replace their receivers ground is removed from conductor 28 by the selector circuit S, thereby releasing relays 1 and 30. Relay 30, in releasing, opens the tip and ring conductors 36 and 37, and energizes the release magnet 39 in a circuit from battery through the winding of that magnet, upper armature and front contact of springs 38, right inner back contact of relay 29, right outer back contact of relay 30, left back contact of relay 14 to ground over the lower make contact of springs 38. Release magnet 39, in energizing, causes line finder brushes 8, 15, 16, 17 and 18 to restore to their normal position. As the brushes return to normal, the vertical off-normal springs 38 restore to normal thereby releasing magnet 39 and relay 27. Relay 27, in releasing, again closes the circuit from the winding of relay 14 to the right front contact of the group start relay 12, and the line finder is ready to hunt for another calling line. Relay 1, in releasing, connects ground over its upper back contact to the tip line conductor 25, and connects negative potential through its lower winding and over its lower back contact to ring line conductor 26 thereby restoring line circuit LC to its normal idle condition.

It will be noted that the circuit from the winding of relay 13 to the anode 35 of the tube 10 is carried over the back contacts of vertical magnet 11 and rotary magnet 20. During the vertical and horizontal stepping of the brushes, the anode circuit of tube 10 is therefore held open for an interval until the release of magnet 11 or 20, as the case may be, closes its back contact. This interval is provided to prevent relay 13 from operating too soon due to the overthrow of the brushes during stepping, at which time the brushes may momentarily contact the succeeding segment or set of line terminals before coming to rest in the proper position associated with the particular step taken. For example, during the third vertical step of the brushes, brush 7 may momentarily overthrow to segment 34 before coming to rest on the third segment. Tube 10 may break down momentarily but, since its anode circuit is open at the back contact of vertical magnet 11 which is not yet released, relay 13 can not operate and stop the vertical stepping prematurely. Similarly, during rotary stepping, the overthrow of brush 18 to test terminal 24 during the preceding rotary step may momentarily cause tube 10 to break down but in this case the operated rotary magnet 20 holds open the anode circuit and relay 13 can not operate to cause a premature stopping of rotary hunting. In either case, by the time that magnet 11 or magnet 20 releases and closes the anode circuit for tube 10, brush 7 or 18 will have come to rest on the proper segment or terminal.

Resistance 33 is provided to limit the current flow between the cathodes of tube 10. Resistance 40 serves to stabilize the potential of control electrode 32.

What is claimed is:

1. In combination in a telephone system, a plurality of subscriber's lines, a semiconducting device comprising a base member comprising semiconducting material, a collector electrode and a plurality of emitter electrodes engaging said base member, connection individually interconnecting one of said lines and one of said emitter electrodes, voltage supply means for supplying voltages to said emitters under control of the line individual thereto, responsive means connected in circuit with said collector responsive to a call from one of said subscriber's lines.

2. In combination in a telephone system, a plurality of subscriber's lines, a semiconducting device having a base element comprising semiconducting material, a collector element and a plurality of emitter elements engaging said base element, means for supplying voltage between said base and collector elements such that substantially no current flows between these elements, an individual connection between one of said lines and one of said emitters, and connections between said line and emitter for applying a voltage to said emitter in response to the initiation of a call on said line for causing a current to flow between said collector and base elements.

3. In combination in a telephone system, a plurality of subscriber's lines, a semiconducting device having a base element comprising semiconducting material, a collector element engaging said semiconducting material and a plurality of emitter elements each engaging said semiconducting material each individual to a different one of said subscriber's lines, means for applying a voltage between said base and collector elements such that substantially no current flows between these elements when said voltage is acting alone, means for supplying voltages to said emitter elements in response to the initiation of a call on any one or more of the respective lines sufficient to cause a current to flow between said base and collector elements, and indicating means responsive to said current between the base and collector elements of said semiconducting device.

4. In a signaling system, a plurality of lines, a switching mechanism for interconnecting said lines, a semiconducting device common to a group of lines having a base element comprising semiconducting material, a collector element engaging said base element, and a control element engaging said base element and individual to each line of said group of lines, a polarizing voltage source connected in a circuit including said base and collector elements, connections between said line and the emitter individual thereto for applying a voltage to the respective emitters to cause substantial current to flow between said base and collector elements in response to a call originating on any one of lines, and apparatus responsive to said current to initiate the operation of said switching apparatus to establish a connection to the line on which a call is originated.

THOMAS L. DIMOND.

REFERENCES CITED

The following references are of record in the file of this patent:

UNITED STATES PATENTS

| Number | Name | Date |
|---|---|---|
| 2,028,195 | Dimond | Jan. 21, 1936 |
| 2,476,323 | Rack | July 19, 1949 |

OTHER REFERENCES

Radio and Television News, page 154, December 1948.